United States Patent
Woo

[11] Patent Number: 5,898,467
[45] Date of Patent: Apr. 27, 1999

[54] CIRCUIT FOR REGULATING A HORIZONTAL SIZE AND A VERTICAL SIZE OF FRAME

[75] Inventor: Sang-Yean Woo, Kyeonggi-Do, Rep. of Korea

[73] Assignee: Daewoo Electronics Co., Ltd., Seoul, Rep. of Korea

[21] Appl. No.: 08/757,656

[22] Filed: Nov. 29, 1996

[30] Foreign Application Priority Data

Nov. 30, 1995 [KR] Rep. of Korea ................. 95-45777

[51] Int. Cl.⁶ .......................... H04N 07/18; H01J 29/56
[52] U.S. Cl. .................. 348/806; 348/807; 315/371; 315/373
[58] Field of Search .................. 315/371, 373, 315/388, 389, 383, 408; 348/805, 806, 807, 746, 747, 583, 571

[56] References Cited

U.S. PATENT DOCUMENTS

| | | |
|---|---|---|
| 4,318,036 | 3/1982 | Bart et al. . |
| 4,501,996 | 2/1985 | Yamaguchi .................. 315/371 |
| 4,916,365 | 4/1990 | Arai .................. 315/383 |
| 5,034,667 | 7/1991 | Lendaro .................. 315/389 |
| 5,113,122 | 5/1992 | Bando et al. .................. 315/371 |
| 5,448,140 | 9/1995 | Douken et al. .................. 315/371 |
| 5,508,593 | 4/1996 | George .................. 348/746 |
| 5,596,248 | 1/1997 | Hosoi et al. .................. 348/807 |
| 5,686,800 | 11/1997 | Kim .................. 348/806 |
| 5,698,953 | 12/1997 | Shim .................. 315/371 |

FOREIGN PATENT DOCUMENTS

| | | |
|---|---|---|
| 2 172 179 | 3/1986 | United Kingdom . |
| 2 272 617 | 7/1992 | United Kingdom . |

Primary Examiner—Tommy P. Chin
Assistant Examiner—Anand S. Rao
Attorney, Agent, or Firm—Sixbey, Friedman Leedom & Ferguson; Frank P. Presta; Joseph S. Presta

[57] ABSTRACT

A frame size regulating circuit provides high picture quality to a viewer by regulating a frame width according to a picture brightness signal and pulsewidth modulation signals. The circuit includes a microprocessor for generating pulsewidth modulation signals for respectively regulating horizontal and vertical sizes of the frame according to horizontal and vertical sync signals from the external, and a horizontal-size control signal generator part for generating a horizontal size control signal for regulating the horizontal size according to the first pulsewidth modulation signal of the microprocessor and a picture brightness signal from a flyback transformer. A horizontal size control part overlaps the horizontal size control signal with a distortion correction signal, and a vertical-size control signal generator part generates a vertical size control signal for regulating the vertical size according to the picture brightness signal and the second pulsewidth modulation signal of the microprocessor to provide the vertical size control signal to a deflection circuit. The frame size is regulated according to the picture brightness signal and high voltage fluctuation to improve picture quality.

9 Claims, 3 Drawing Sheets

CIRCUIT FOR REGULATING A HORIZONTAL SIZE AND A VERTICAL SIZE OF FRAME

BACKGROUND OF THE INVENTION

1. Field of the Invention

The present invention relates to a monitor, and more particularly to a frame size regulating circuit of a monitor for regulating a frame size in accordance with a picture brightness signal and pulsewidth modulation signals to thereby provide high picture quality to a viewer.

2. Description of the Prior Art

In a television set or a monitor, generally, a vertical sync signal ("synchronization" is abbreviated as "sync") and a horizontal sync signal are supplied to a deflection circuit which in turn oscillates the vertical sync signal and horizontal sync signal to provide a vertical deflection signal of a triangular waveform and a horizontal deflection signal of a square waveform. The vertical deflection signal of the triangular waveform is applied to a convergence coil and a vertical deflection yoke, and the horizontal deflection signal of the square waveform is applied to the convergence coil, a horizontal deflection yoke and a flyback transformer.

The convergence coil generates a uniform magnetic field for maintaining a convergence of electron beams which is supplied to the frontal plane of a CRT (Cathode Ray Tube) screen, deflecting the electron beams in the horizontal and the vertical direction in the vertical and the horizontal deflection yoke, and maintaining convergence and purity. The flyback transformer produces a high voltage required for the CRT.

Once the high voltage produced from the flyback transformer ascends over a preset value, the rectilinear motion of the electron beams is reinforced. Thus, the electron beams collide against the frontal plane of the CRT prior to being fully deflected to reduce the frame size. However, if the high voltage descends below the preset value, the deflecting action of the electron beams is reinforced to enlarge the frame size.

A frame size regulating circuit for correcting the varied frame size resulting from the fluctuation of the high voltage is illustrated in FIG. 1.

In FIG. 1, a reference numeral 1 denotes a microprocessor for generating pulsewidth modulation signals PWM1 and PWM2 having varied duties in accordance with horizontal and vertical sync signals Hs and Vs, and a reference numeral 2 is a horizontal-size control signal generator part for generating a horizontal size control signal of DC component for regulating the horizontal size in accordance with pulsewidth modulation signal PWM1. A reference numeral 3 denotes a horizontal size control signal part for overlapping the horizontal size control with an externally-provided distortion correction signal GD, and regulating the horizontal size by an overlap signal obtained. A reference numeral 4 denotes a vertical-size control signal generator part for generating a vertical size control signal of DC component for regulating the vertical size in accordance with pulsewidth modulation signal PWM2, and a reference numeral 5 is a deflection circuit for producing a vertical deflection signal of triangular waveform in accordance with the vertical size control signal and externally-provided vertical sync signal Vs.

Horizontal-size control signal generator part 2 is illustrated in FIG. 2. Here, horizontal-size control signal generator part 3 includes an amplifier for amplifying a DC voltage obtained by shaping pulsewidth modulation signal PWM1, and resistors 22 and 24 connected to the (−) port of amplifier 20 and an output side of amplifier 20 for determining the amplification factor of the DC voltage. In addition to these, a plurality of resistors 10, 12, 14 and 18 and a capacitor 16 are connected to the (+) port of amplifier 20 for overlapping pulsewidth modulation signal PWM1 with a division signal of a DC power source Vcc to provide a DC voltage.

Referring to FIG. 2, the connection of plurality of resistors 10, 12, 14 and 18 and capacitor 16 will be considered. An output side of microprocessor 1 is connected with one port of resistor 10 which biases pulsewidth modulation signal PWM1, and the other side of resistor 10 is connected to output sides of resistors 12 and 14 for dividing externally-supplied power source Vcc. The other side of resistor 14 is grounded. The other side of resistor 10 and output side of resistor 12 are connected to each other, and the output side of resistor 12 is connected to one side of capacitor 16 for smoothing the overlap signal of the division voltage of resistors 12 and 14, and the other side of capacitor 16 is grounded. One side of capacitor 16 is connected to one side of resistor 18 for biasing an output voltage of capacitor 16, and the other side of resistor 18 is connected to the (+) port of amplifier 20.

Meanwhile, vertical-size control signal generator part 4 is constructed to be identical to horizontal-size control signal generator part 2.

In the above-described conventional frame size regulating circuit, an operation of horizontal-size control signal generator circuit 2 will be described first. Pulsewidth modulation signal PWM1 of microprocessor 1 is supplied to resistor 10 of horizontal-size control signal generator circuit 2, and resistor 10 biases pulsewidth modulation signal PWM1. Externally-supplied power source Vcc is supplied to resistors 12 and 14 which then divide power source Vcc, and the bias voltage of resistor 10 and division voltages of resistors 12 and 14 overlap with each other.

The overlap signal is supplied to capacitor 16 which smooths the overlap signal to provide a first DC voltage. Then, the first DC voltage is supplied to amplifier 20 to be amplified. At this time, the amplification factor of amplifier 20 is determined in association with resistors 22 and 24. Here, the amplified DC voltage is the horizontal size control signal which is provided to be approximately 4.95 V when the horizontal size is maximum and to be approximately 10.56 V when the horizontal size is minimum.

The horizontal size control signal of horizontal-size control signal generator part 2 is supplied to horizontal size control part 3. Then, horizontal size control part 3 overlaps the horizontal size control signal with distortion correction signal GD supplied from an microcomputer(not shown), and supplies the overlap signal to an diode modulation(not shown).

On the other hand, vertical-size control signal generator part 4 is operated to be identical to horizontal-size control signal generator part 2 to provide the vertical size control signal of DC component. The vertical size control signal is supplied to deflection circuit 5. In deflection circuit 5, the vertical deflection signal of triangular waveform is generated in accordance with the vertical size control signal and vertical sync signal.

However, in the conventional monitor, the number of electron beams is varied in accordance with the brightness of an image. Also, once the number of electron beams is varied, the frame size is varied as well. In other words, when the image is brightened, the number of electron beams is increased to increase the current flowing to the flyback transformer to increase overall amount of the current. Then, the high voltage is lowered to enlarge the frame size.

In the event that such conventional frame size regulating circuit is employed, the frame size is varied as many as approximately 6 mm when the high voltage is fluctuated within the range of about 24 KV to 25 KV. In other words, the frame size is severely varied due to the change of the brightness of image to involve a drawback of degrading picture quality.

SUMMARY OF THE INVENTION

Therefore, it is an object of the present invention to provide a frame regulating circuit capable of improving picture quality by regulating a frame size in accordance with a picture brightness signal and pulsewidth modulation signals.

To achieve the above object of the present invention, there is provided a frame size regulating circuit including a microprocessor for generating at least one pulsewidth modulation signal for regulating horizontal and vertical sizes in accordance with externally-supplied horizontal and vertical sync signals. Also, a horizontal-size control signal generator parts generates a horizontal size control signal of DC component for regulating the horizontal size in accordance with the first pulsewidth modulation signal of the microprocessor and a picture brightness signal supplied from a flyback transformer. A horizontal size control part overlaps the horizontal size control signal with a distortion correction signal, and a vertical-size control signal generator part generates a vertical size control signal of DC component for regulating the vertical size in accordance with the picture brightness signal and the second pulsewidth modulation signal of the microprocessor to provide the vertical size control signal to a deflection circuit.

According to the preferred embodiment of the present invention, the first pulsewidth modulation signal of the microprocessor and picture brightness signal are supplied to the horizontal-size control signal generator part. In the horizontal-size control signal generator part, the first pulsewidth modulation signal and picture brightness signal are shaped for generating the horizontal control signal of DC component to provide it to the horizontal size control part. Then, the horizontal size control part overlaps the horizontal size control signal with the distortion correction signal. Meanwhile, the second pulsewidth modulation signal of the microprocessor and picture brightness signal are supplied to the vertical-size control signal generator circuit. Then, the vertical-size control signal generator circuit generates the vertical size control signal of DC component in accordance with the second pulsewidth modulation signal and picture brightness signal to supply the vertical size control signal to the deflection circuit. Consequently, the frame size is regulated in accordance with the high voltage fluctuation and frame brightness to improve the picture quality.

BRIEF DESCRIPTION OF THE DRAWINGS

The above objects and other advantages of the present invention will become more apparent by describing in detail preferred embodiments thereof with reference to the attached drawings in which.

DETAILED DESCRIPTION OF THE PREFERRED EMBODIMENT

A frame size regulating circuit according to the present invention will be described in detail with reference to accompanying drawings.

Figure 1:
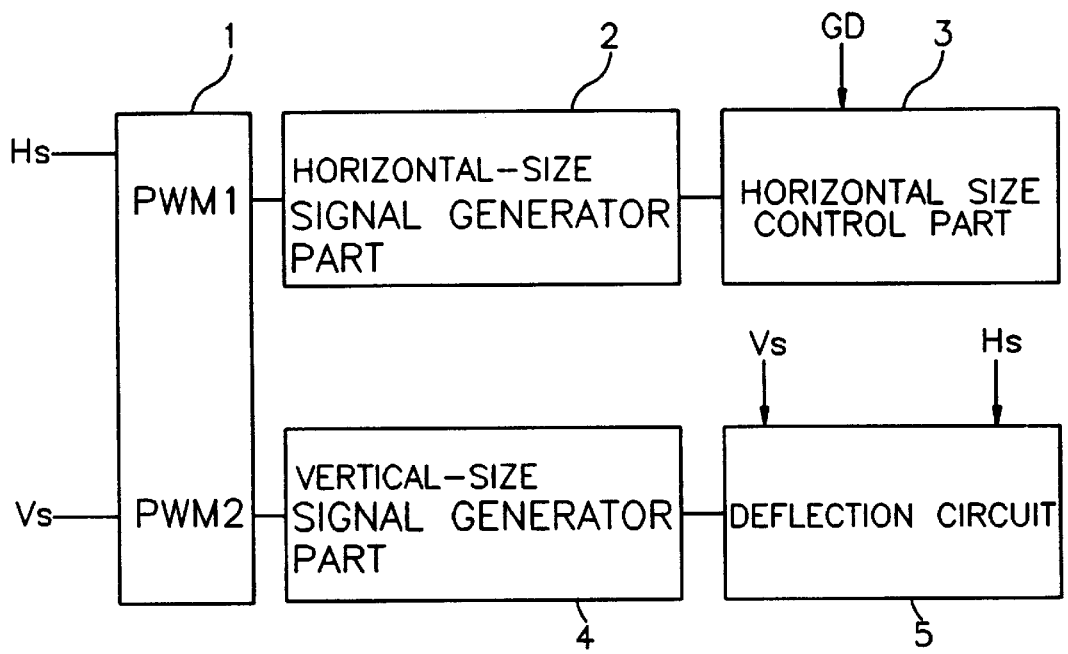
FIG. 1 is a view showing a construction of a conventional frame size regulating circuit.
Figure 2:
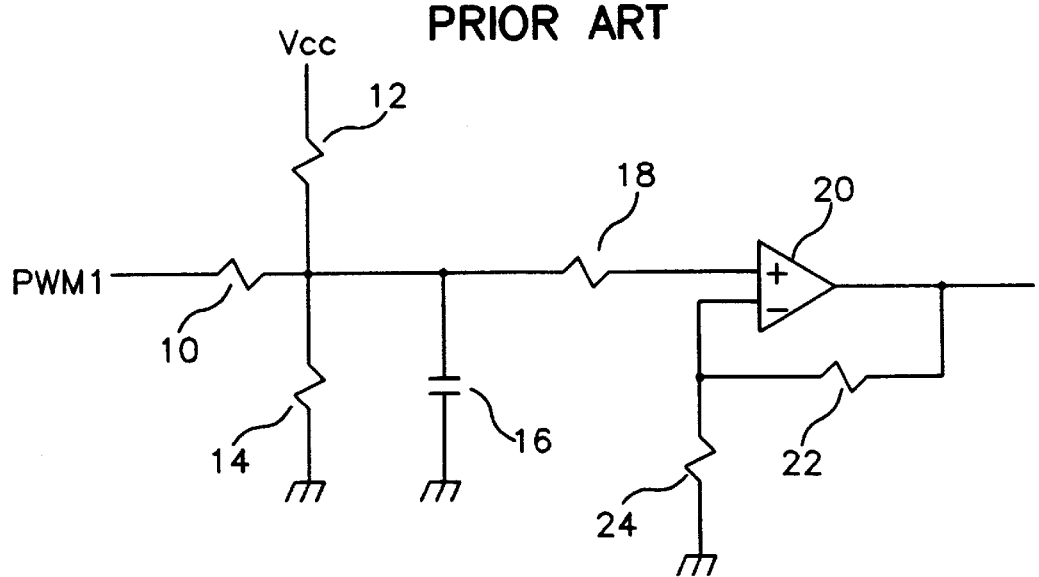
FIG. 2 is a view showing a construction of the horizontal-size control signal generator part in FIG. 1.
Figure 3:
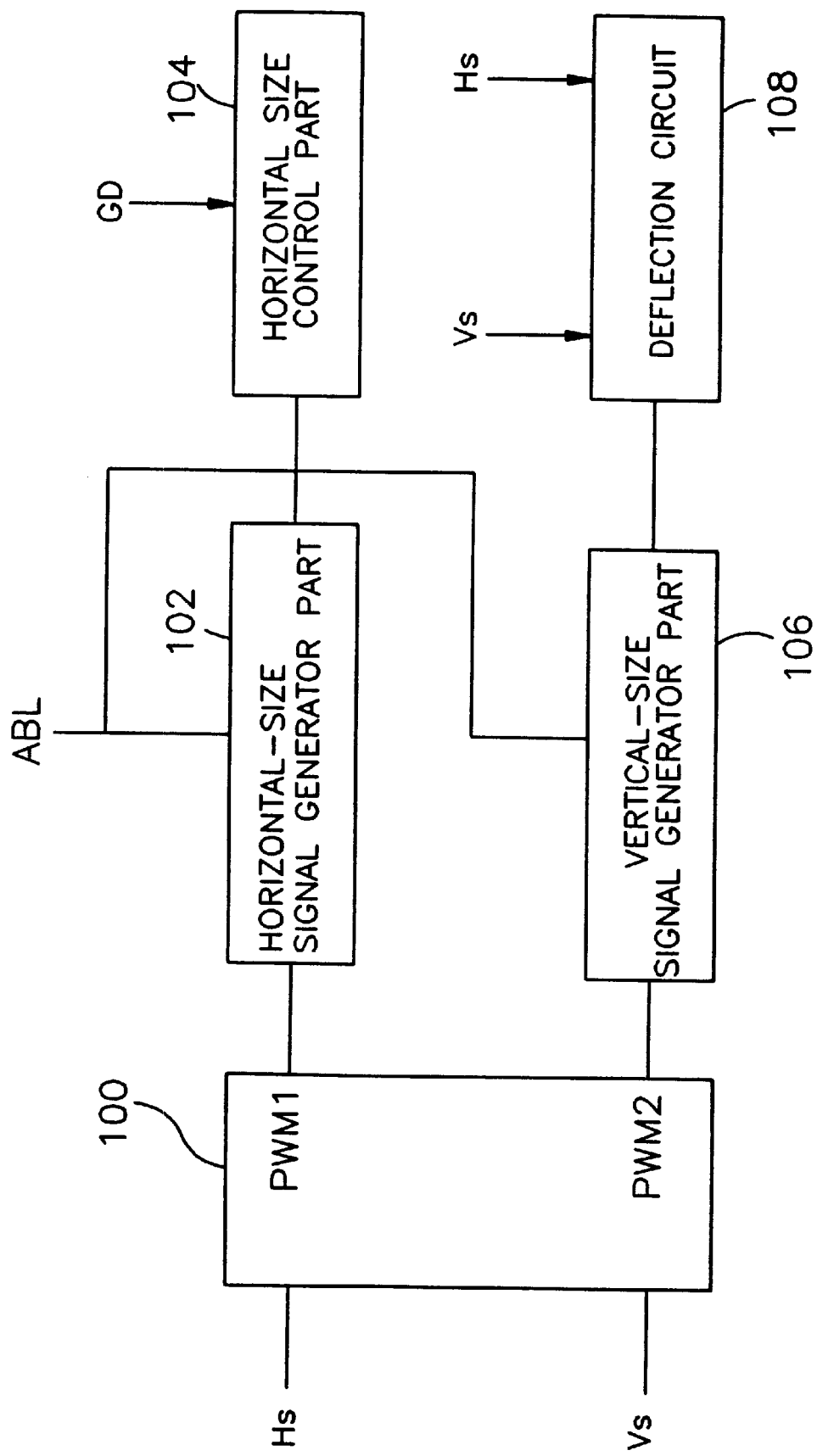
FIG. 3 is a view showing a construction of a frame size regulating circuit according to the present invention.

FIG. 3 is a view showing a construction of the frame size regulating circuit according to the present invention. In FIG. 3, a reference numeral 100 denotes a microprocessor for generating pulsewidth modulation signals PWM1 and PWM2 with varied duties in accordance with horizontal and vertical sync signals Hs and Vs, and 102 is a horizontal-size control signal generator part for generating a horizontal size control signal of DC component for regulating the horizontal size in accordance with pulsewidth modulation signal PWM1 and a picture brightness signal ABL produced from an flyback(not shown) transformer. A reference numeral 104 denotes a horizontal size control part for overlapping the horizontal size control signal with a distortion correction signal GD.

A reference numeral 106 denotes a vertical-size control signal generator part for generating a vertical size control signal of DC component for regulating the vertical size in accordance with pulsewidth modulation signal PWM2 and picture brightness signal ABL, and 108 is a deflection circuit for generating a vertical deflection signal by receiving the vertical size control signal and vertical sync signal.

Figure 4:
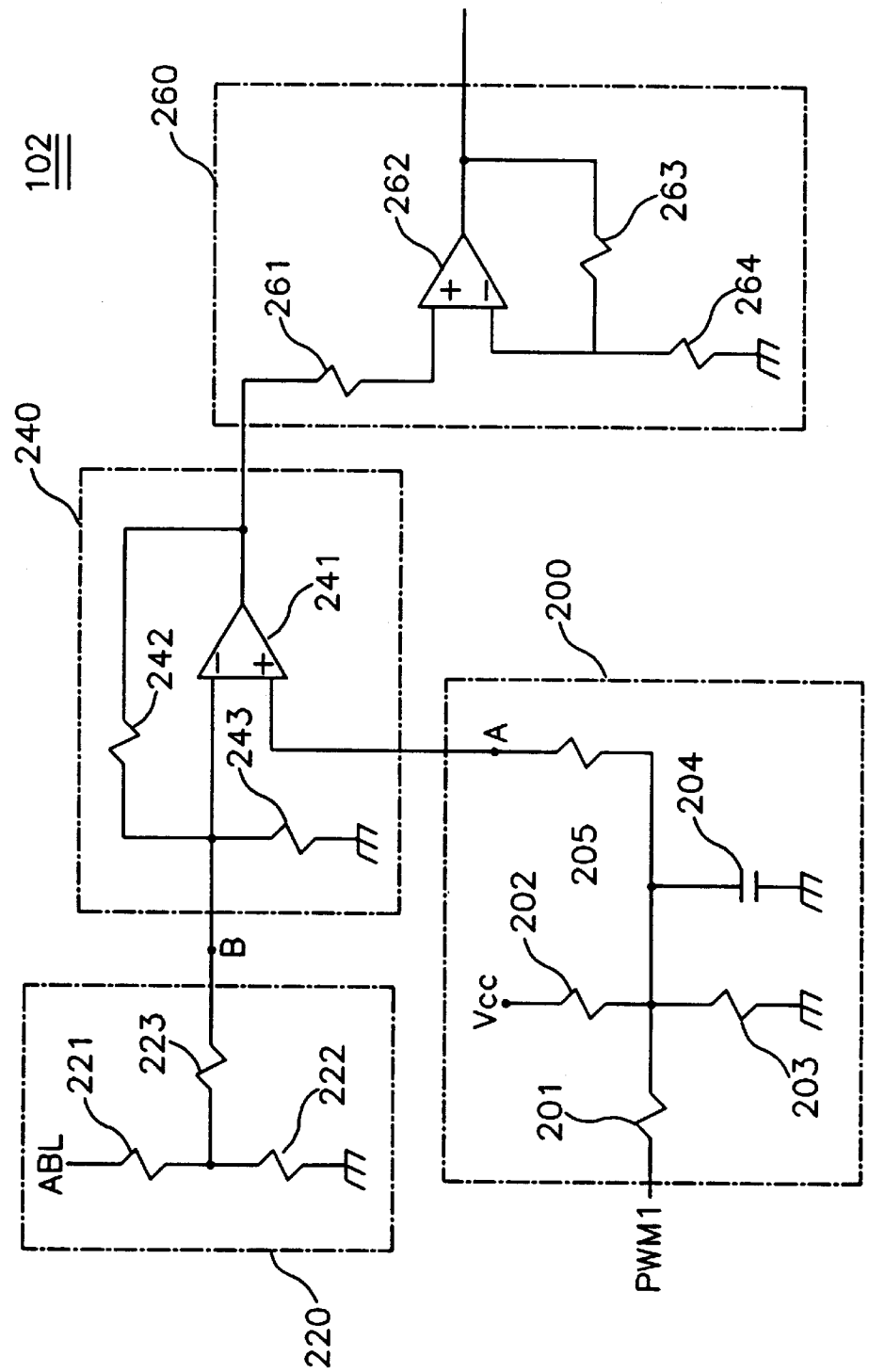
FIG. 4 is a view showing a construction of the horizontal-size control signal generator part in FIG. 3.

Here, horizontal-size control signal generator part 102 is illustrated in FIG. 4. Here, a reference numeral 200 denotes a first shaping part for shaping pulsewidth modulation signal PWM1 to provide a first DC voltage A; 220 is a second shaping part for shaping picture brightness signal ABL to provide a second DC voltage B; and 240 is an operator part for operating first DC voltage A of first shaping part 200 and second DC voltage B of second shaping part 220. Also, a reference numeral 260 denotes an amplifier part for amplifying an output voltage of operator part 240.

More specifically, the construction of foregoing horizontal-size control signal generator part 102 will be described.

An output side of a resistor 201 of first shaping part 200 for biasing pulsewidth modulation signal PWM1 and output sides of resistors 202 and 203 for dividing an externally-provided DC power source Vcc overlap with an output signal of resistor 201 and a division voltage of resistors 202 and 203, and are connected with a capacitor 204 for smoothing an overlap signal to provide first DC voltage A. The other side of capacitor 204 and the other side of resistor 203 are grounded.

One side of capacitor 204 is connected with one side of a resistor 205 for biasing first DC voltage A.

Meantime, output sides of resistors 221 and 222 for dividing picture brightness signal ABL are connected with an input side of a resistor 223 for providing second DC voltage B by biasing. An output side of resistor 222 is grounded.

The (+) port of an adder 241 of operator part 240 for adding first DC voltage A to second DC voltage B is connected to the other side of resistor 205, and the (−) port of adder 241 is connected to the output side of resistor 223. Resistors 242 and 243 for determining the amplification factor of adder 241 are serially connected, one side of resistor 242 is connected to an output side of adder 241, and the other side of resistor 243 is grounded. The other side of resistor 242 is connected to the (−) port of adder 241.

The output side of adder 241 is connected with one side of a resistor 261 of amplifier part 260 for biasing an output voltage of adder 241, and is connected with the (+) port of amplifier 262 for amplifying an output voltage of the other side of resistor 261. Resistors 263 and 264 for determining the amplification factor of amplifier 262 are serially connected between the output side of amplifier 262 and the ground, and the other side of resistor 263 is connected with the (−) port of amplifier 262.

Hereinbelow, the operation of the frame size regulating circuit according to the present invention and the effect resulting therefrom will be described.

Externally-supplied horizontal sync signal Hs and vertical sync signal Vs are supplied to microprocessor 100. Then, microprocessor 100 generates pulsewidth modulation signals PWM1 and PWM2 corresponding to horizontal sync signal Hs and vertical sync signal Vs, in which pulsewidth modulation signal PWM1 is supplied to horizontal-size control signal generator part 102.

Picture brightness signal ABL from the flyback transformer is supplied to horizontal-size control signal generator part 102.

Horizontal-size control signal generator part 102 inputs the horizontal pulsewidth modulation signal PWM1 and picture brightness signal ABL and generates a horizontal size control signal of DC component for regulating the horizontal size in accordance with the pulsewidth modulation signal PWM1 and the picture brightness signal ABL.

A process for generating the horizontal size control signal of DC component will be described in detail with reference to FIG. 4. Pulsewidth modulation signal PWM1 is supplied to resistor 201 of first shaping part 200, and resistor 201 biases pulsewidth modulation signal PWM1. Meantime, DC power source Vcc is supplied to resistors 202 and 203 which divide power source Vcc. The bias signal of resistor 201 and the division signal of resistors 202 and 203 overlap with each other, and the overlap signal is supplied to capacitor 204 which smooths the overlap signal. The smoothing voltage of capacitor 204 is supplied to resistor 205 which biases the smoothing voltage to provide first DC voltage A. Here, first DC voltage A is approximately 1.74 V when the horizontal size is maximum, and is approximately 3.76 V when the horizontal size is minimum.

On the other hand, the picture brightness signal ABL is supplied to resistors 221 and 222 of second shaping part 220. Resistors 221 and 222 in turn divide picture brightness signal ABL. The picture brightness signal divided by resistors 221 and 222 is supplied to resistor 223 which then provides biased second DC voltage B.

First DC voltage A and second DC voltage B are supplied to adder 241 of operator part 240, and adder 241 performs arithmetic of first DC voltage A and second DC voltage B. That is, the output voltage of operator part 240 is determined by first DC voltage A, second DC voltage B and resistors 242 and 243.

The output voltage of adder 241 is approximately 3.78 V when the horizontal size has the maximum value and the picture brightness signal is white being the maximum value, and is 3.261 V when the horizontal size has the maximum value and the picture brightness signal is green. Also, the output voltage thereof is 3.115 V when the horizontal size has the maximum value and the picture brightness signal is blue, and is 3.006 V when the horizontal size has the maximum value and the picture brightness signal is black being the minimum value.

On the other hand, the output voltage of adder 241 is approximately 11.52 V when the horizontal size has the minimum value and the picture brightness signal is white being the maximum value, and is 10.92 V when the horizontal size has the minimum value and the picture brightness signal is green. Also, the output voltage thereof is 10.87 V when the horizontal size has the minimum value and the picture brightness signal is blue, and is 10.29 V when the horizontal size has the minimum value and the picture brightness signal is black being the minimum value.

The output voltage of adder 241 is supplied to resistor 261 of amplifier part 260, resistor 261 biases the output voltage of adder 241. The bias voltage is supplied to the (+) port of amplifier 262 which amplifies the bias voltage. At this time, the amplification factor is determined by resistors 263 and 264.

The output voltage of amplifier 262 is approximately 3.859 V when the horizontal size has the maximum value and the picture brightness signal is white being the maximum value, and is 3.444 V when the horizontal size has the maximum value and the picture brightness signal is green. Also, the output voltage thereof is 3.302 V when the horizontal size has the maximum value and the picture brightness signal is blue, and is 3.226 V when the horizontal size is maximum and the picture brightness signal is black being the minimum value.

Meantime, the output voltage of amplifier 262 is approximately 12.32 V when the horizontal size has the minimum value and the picture brightness signal is white being the maximum value, and is 11.86 V when the horizontal size has the minimum value and the picture brightness signal is green. Also, the output voltage thereof is 11.72V when the horizontal size has the minimum value and the picture brightness signal is blue, and is 11.69 V when the horizontal size has the minimum value and the picture brightness signal is black being the minimum value.

The output voltage of horizontal-size control signal generator part 102 is supplied to horizontal size control part 104, and then overlaps with distortion correction signal GD in horizontal size control part 104.

On the other hand, vertical-size control signal generator part 106 which generates the vertical size control signal of DC component for regulating the vertical size from pulsewidth modulation signal PWM2 of microprocessor 100 is operated to be identical to horizontal-size control signal generator part 102, and the vertical size control signal of vertical-size control signal generator part 106 is supplied to deflection circuit 108. Thus, deflection circuit 108 produces the vertical deflection signal in accordance with the vertical size control signal and vertical sync signal.

By employing the frame size regulating circuit according to the present invention, the difference of the frame size is roughly 2 mm when the high voltage fluctuates within the range from approximately 24.3 KV to 25 KV. Therefore, the difference of the frame size caused by the high voltage fluctuation and picture brightness can be minimized to maximally improve picture quality.

While the present invention has been particularly shown and described with reference to particular embodiment thereof, it will be understood by those skilled in the art that various changes in form and details may be effected therein without departing from the spirit and scope of the invention as defined by the appended claims.

What is claimed is:

1. A circuit for regulating a horizontal size and a vertical size of a frame, comprising:

microprocessor for generating a plurality of pulsewidth modulation signals for regulating horizontal and vertical sizes of a frame in accordance with externally-supplied horizontal and vertical sync signals;

horizontal size control signal generator means for generating a horizontal size control of DC component for regulating said horizontal size in accordance with the first pulsewidth modulation signal of said microprocessor and a picture brightness signal supplied from a flyback transformer;

horizontal size control means for overlapping said horizontal size control signal with a distortion correction signal, wherein said horizontal size control means includes:

first shaping means for shaping said first pulsewidth modulation signal to provide a first DC voltage;

second shaping means for shaping said picture brightness signal to provide a second DC voltage;

first operator means for adding said first DC voltage to said second DC voltage to provide a first operation voltage; and first amplifier means for amplifying said first operation voltage to provide said horizontal size control signal; and vertical size control signal generator means for generating a vertical size control signal of DC component for regulating said vertical size in accordance with said picture brightness signal and the second pulse-width modulation signal of said microprocessor to provide said vertical size control signal to a deflection circuit, wherein said vertical size control signal generator means includes:

third shaping means for sapping said second pulsewidth modulation signal to provide a third DC voltage;

fourth shaping means for shaping said picture brightness signal to provide a fourth DC voltage;

second operator means for adding said third DC voltage to said fourth DC voltage to provide a second operation voltage; and second amplifier means for amplifying said second operation voltage to generate said vertical size control signal.

2. The circuit for regulating a horizontal size and a vertical size of a frame as claimed in claim 1, wherein said first shaping means comprises:

a 1st resistor for biasing said first pulsewidth modulation signal;

2nd and 3rd resistors serially connected for dividing an externally-supplied DC power source and overlapping a division voltage with an output voltage of said 1st resistor to provide an overlap voltage; and a first capacitor for smoothing said overlap voltage to provide said first DC voltage.

3. The circuit for regulating a horizontal size and a vertical size of a frame as claimed in claim 1, wherein said second shaping means comprises fourth and fifth resistors serially connected for dividing said picture brightness signal to provide said second DC voltage.

4. The circuit as claimed in claim 3, wherein said first operator means comprises:

first operator for adding said first DC voltage to said second DC voltage to provide said first operation voltage; and sixth and seventh resistors for determining a coefficient of said first operator, in which sixth resistor is connected between the output side of said first operator and (−) port of said first operator, and seventh resistor is connected between the (−) port of said first operator and a ground.

5. The circuit as claimed in claim 4, wherein said first amplifier means comprises:

first amplifier for amplifying said first operation voltage to provide said horizontal size control signal; and eighth and ninth resistors for determining an amplification factor of said first amplifier, in which said eighth resistor is connected between the output side of said first amplifier and (−) port of said first amplifier, and ninth resistor is connected between the (−) port of said first amplifier and the ground.

6. The circuit for regulating a horizontal and a vertical sizes of a frame as claimed in claim 1, wherein said third shaping means comprises:

a tenth resistor for biasing said first pulsewidth modulation signal;

eleventh and twelveth resistors serially connected for dividing said externally-supplied DC power source and overlapping said division voltage with an output voltage of 10th resistor to provide said overlap voltage; and a third capacitor for smoothing said overlap voltage to provide said third DC voltage.

7. The circuit for regulating a horizontal and a vertical sizes of a frame as claimed in claim 1, wherein said fourth shaping means comprises thirteenth and fourteenth resistors serially connected for dividing said picture brightness signal to provide said division voltage.

8. The circuit as claimed in claim 7, wherein said second operator means comprises:

a second operator for adding said third DC voltage to fourth DC voltage to provide said second operation voltage; and fifteenth and sixteenth resistors for determining a coefficient of said second operator, in which said fifteenth resistor is connected between the output side of said second operator and (−) port of said second operator, and said sixteenth resistor is connected between the (−) port of said second operator and the ground.

9. The circuit as claimed in claim 8, wherein said second amplifier means comprises:

a second amplifier for amplifying said second operation voltage to provide said horizontal size control signal; and seventeenth and eighteenth resistors for determining an amplification factor of said second amplifier, in which said seventeenth resistor is connected between the output side of said second amplifier and (−) port of said second amplifier, and said eighteenth resistor is connected between the (−) port of said second amplifier and the ground.

* * * * *